United States Patent [19]
Inada et al.

[11] Patent Number: 5,214,958
[45] Date of Patent: Jun. 1, 1993

[54] MISFIRING DETECTING APPARATUS FOR AN INTERNAL COMBUSTION DEVICE

[75] Inventors: Masanori Inada; Akira Demizu; Akihiro Nakagawa, all of Himeji, Japan

[73] Assignee: Mitsubishi Denki Kabushiki Kaisha, Tokyo, Japan

[21] Appl. No.: 834,812

[22] Filed: Feb. 13, 1992

[30] Foreign Application Priority Data

Feb. 18, 1991 [JP] Japan .................. 3-022487

[51] Int. Cl.⁵ .......................................... G01M 15/00
[52] U.S. Cl. .................................................. 73/117.3
[58] Field of Search ............. 73/116, 117.2, 117.3, 73/35; 123/419, 425, 435, 479; 60/276, 277, 705; 340/439

[56] References Cited

U.S. PATENT DOCUMENTS

| | | | |
|---|---|---|---|
| 3,924,457 | 12/1975 | Oshima et al. | 73/116 |
| 4,700,563 | 10/1987 | Iwata et al. | 73/118.1 |
| 4,887,574 | 12/1989 | Kuroiwa et al. | 73/116 |
| 5,044,195 | 9/1991 | James et al. | 73/117.3 |
| 5,105,657 | 4/1992 | Nakaniwa | 73/117.3 |
| 5,168,859 | 12/1992 | Ohisaki | 73/116 |

FOREIGN PATENT DOCUMENTS

| | | | |
|---|---|---|---|
| 19532 | 2/1983 | Japan . | |
| 263241 | 10/1988 | Japan . | |
| 0172728 | 7/1989 | Japan | 73/116 |

*Primary Examiner*—Robert Raevis
*Attorney, Agent, or Firm*—Sughrue, Mion, Zinn, Macpeak and Seas

[57] ABSTRACT

An apparatus for defecting occurrence of misfiring in an internal combustion engine with improved reliability. A change in an angular velocity of a crankshaft of the engine and a change in the output of an air/fuel ratio sensor are monitored. Only when both changes indicate occurrence of misfiring independently from each other, it is decided that misfiring in the cylinder has taken place. Reliability in misfiring detection is improved by using the results obtained through at least two mutually different types of misfiring detections.

7 Claims, 7 Drawing Sheets

MISFIRING DETECTING APPARATUS FOR AN INTERNAL COMBUSTION DEVICE

BACKGROUND OF THE INVENTION

The present invention relates to an apparatus for detecting misfiring in an internal combustion engine, and more particularly to a misfire detecting apparatus for an engine of a motor vehicle.

Misfiring is a phenomenon which occurs in an internal combustion engine when a cylinder of the engine fails to ignite. Misfiring can be due to a number of causes, such as a failure of the ignition system to generate an adequate spark in a cylinder or a failure of a fuel supply system to supply a proper air/fuel mixture to the cylinder. When misfiring is due to a failure of the ignition system, uncombusted fuel is discharged from a misfiring cylinder. The discharge of uncombusted fuel from an engine is of course undesirable because of possible damage to a catalytic converter of the engine and for other reasons. Therefore, it is desirable to be able to detect occurrence of misfiring in an engine and then cut off the supply of fuel to the cylinder in which misfiring has occurred.

Under the circumstances, various misfiring detecting methods and apparatuses have heretofore been proposed and developed for practical applications. As one of such misfiring detecting methods, there may be mentioned a method disclosed in Japanese Published Unexamined Patent Application No. 58-19532 (JP-A-58-19532), according to which the angular velocity of a crankshaft of an engine is monitored, and decision of the occurrence of misfiring is made when a difference in the angular velocity measured at angular positions located before and after top dead center in the compression stroke exceeds a preset value. According to another misfiring detecting method such as described in JP-A-63-263241, decision as to the occurrence of misfiring is made on the basis of an air/fuel ratio determined by sensing, for example, an oxygen content in an exhaust gas of the engine.

The misfire detecting methods and apparatuses known heretofore, however, suffer from a common problem that reliability in misfiring detection is poor. In the case of the first mentioned misfiring detecting method, for example, a change in the angular velocity of the crankshaft brought about by misfiring is often too insignificant to detect the occurrence of misfiring with reasonable reliability particularly when the engine is operated at a high speed in a unloaded state or in a light load state, because of a low friction loss and high inertial energy of the engine in these operation states. Besides, the angular velocity of the crankshaft of an engine installed on a motor vehicle is likely to change due to other causes than misfiring such as shocks and vibrations to which the motor vehicle is subjected when running on a rough or bad road. On the other hand, in the case of the second mentioned misfiring detecting method, misfiring can be detected only with a delay due to a time lag intervening between the occurrence of misfiring and arrival of the uncombusted gas mixture at the location where the air/fuel ratio sensor installed. Furthermore, the air/fuel ratio is susceptible to changes due to other causes than misfiring. By way of example, the air/fuel ratio considerably varies upon acceleration and deceleration of the engine. Additionally, in a multi-cylinder engine, the air/fuel ratio may differ from one to another cylinder. For these reasons, changes in the output of an air/fuel ratio sensor brought about by the other causes may erroneously be detected as a symptom of misfiring. In other words, the misfiring detecting methods and apparatuses known heretofore are disadvantageous in that misfiring detection can not be performed with satisfactory reliability.

SUMMARY OF THE INVENTION

It is therefore an object of the present invention to eliminate the shortcomings of the misfiring detecting techniques known heretofore and to provide an improved misfiring detecting apparatus which is capable of detecting occurrence of misfiring with enhanced reliability.

In view of the above and other objects which will become apparent as description proceeds, there is provided, according to the present invention, an apparatus for detecting occurrence of misfiring in an internal combustion engine, which apparatus comprises a plurality of sensors for sensing engine operating parameters which differ from one another and which represent a combustion state of the engine, a plurality of misfiring detecting means provided in association with the sensors, respectively, for processing output signals of the sensors, to thereby detect occurrence of misfiring in the engine independently of one another, and decision means connected to the outputs of the plurality of misfiring detecting means for deciding occurrence of misfire when at least two of the plural misfire detecting means detect occurrence of misfiring substantially simultaneously.

In a preferred embodiment of the invention, the sensors may include an crankshaft angular velocity sensor, an air/fuel ratio sensor, an engine cylinder pressure sensor and others, while the misfiring detecting means may comprise a microcomputer on which software can run for correspondingly processing the outputs of the sensors. The decision means may be constituted by an logical product or AND circuit.

With the arrangement of the misfiring detecting apparatus according to the invention described above, reliability in misfire detection can significantly be improved by virtue of such a feature that only when two or more misfiring detecting means including the respective sensors, which operate on the mutually different detection principles and which may complement one another, produce misfiring indication signals substantially simultaneously, the decision means issues a misfire detection signal. Further, the misfiring detecting apparatus can be implemented inexpensively because the various existing engine operation sensors can be used without any appreciable modifications, to another advantage.

The above and other objects, features and advantages of the invention will better be understood by reading the following description of preferred embodiments thereof taken in conjunction with the accompanying drawings.

DESCRIPTION OF THE PREFERRED EMBODIMENTS

Now, the present invention will be described in detail in conjunction with preferred or exemplary embodiments thereof by reference to the drawings.

Figure 1:
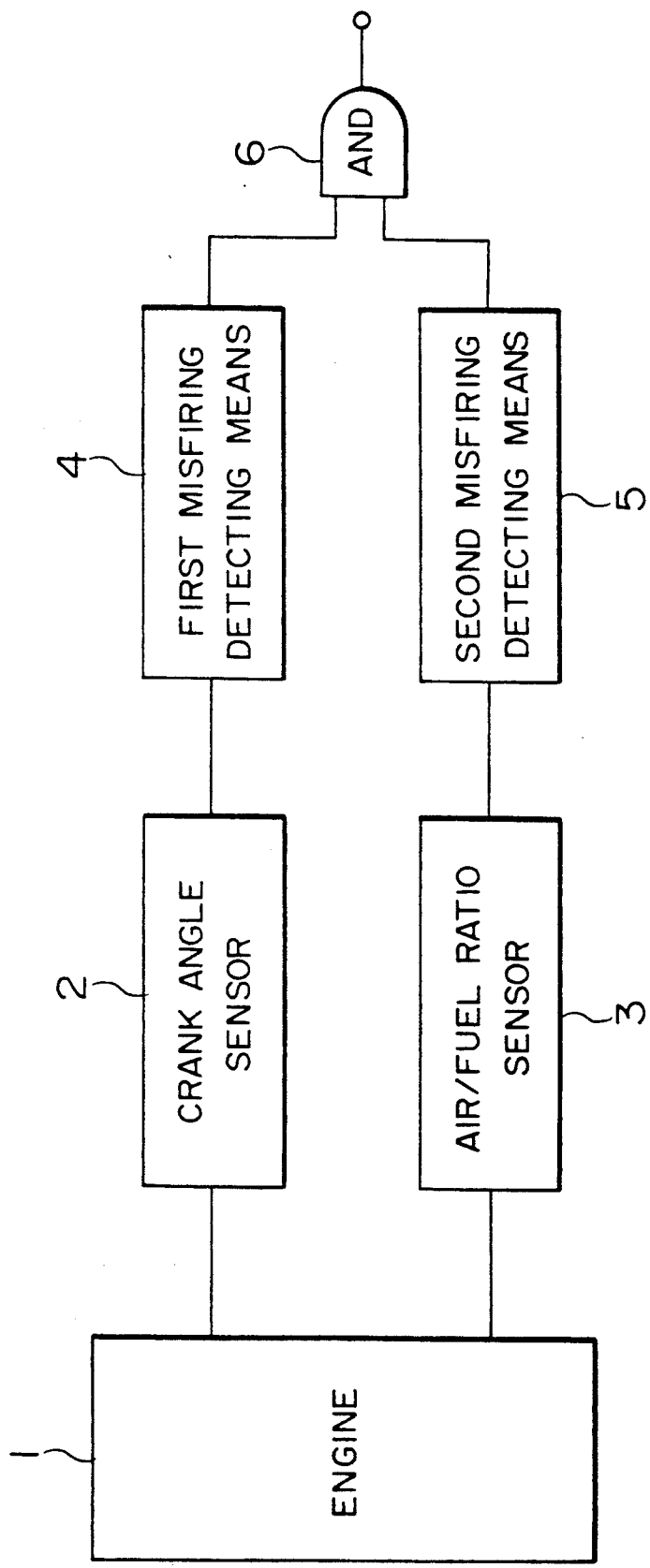
FIG. 1 is a functional block diagram showing the general arrangement of a misfiring detecting apparatus for an internal combustion engine according to an embodiment of the present invention.
Figure 2:
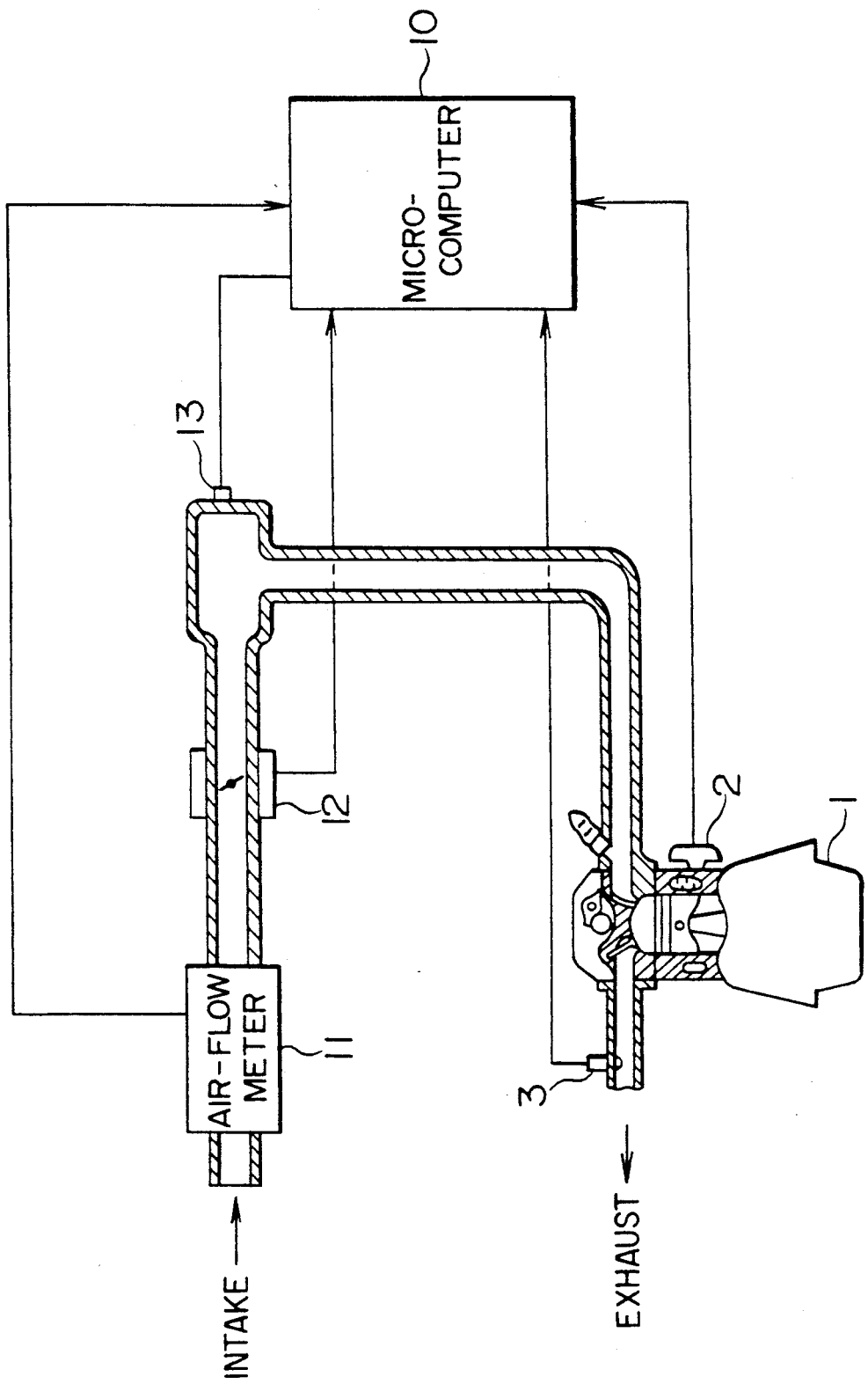
FIG. 2 is a schematic diagram showing the structure of an internal combustion engine to which the misfiring detecting apparatus according to the invention can be applied.

FIG. 1 is a functional block diagram showing the general arrangement of a misfiring detecting apparatus for an internal combustion engine according to an embodiment of the invention, and FIG. 2 is a schematic diagram illustrating an environment structure of the engine which incorporates the misfiring detecting apparatus shown in FIG. 1. In both of the figures, reference numeral 1 generally denotes an internal combustion engine provided with a crank angle sensor 2 which is designed to generate pulses at a reference angular position (e.g., top dead center or TDC) and predetermined angular positions displaced from the reference angular position (or TDC) by predetermined angular distances each 45° in terms of crank angle (hereinafter represented by 45° CA) in precedence to and in succession to the TDC, respectively. The crank angle sensor 2 is installed on the engine 1 so as to detect the rotational or angular positions of a crankshaft of the engine 1, as is schematically illustrated in FIG. 2.

The engine 1 is further equipped with an air/fuel ratio sensor 3 which is disposed in an exhaust pipe of the engine for detecting an air/fuel ratio of an exhaust gas discharged from the engine by sensing, for example, oxygen content of the engine exhaust gas, as can be seen in FIG. 2. The air/fuel ratio sensor 3 may be constituted by a conventional sensor element exhibiting high linearity, as is known in the art.

A first misfiring detecting means 4 shown in FIG. 1 calculates, on the basis of the crank angle data derived from the output of the crank angle sensor 2, a temporal or time ratio representing a ratio between a time taken for the crankshaft to rotate the aforementioned predetermined angular distance preceding to the reference position (TDC) and a time taken for the crankshaft to rotate the predetermined angular distance which succeeds to the reference position (TDC), to thereby detect occurrence of misfiring on the basis of the time ratio, as will hereinafter be described in detail.

A second misfiring detecting means 5 shown in FIG. 2 is designed to detect abnormal leanness of the air/fuel mixture on the basis of data available from the output of the air/fuel ratio sensor 3 to thereby make decision as to occurrence of misfiring.

The outputs of the first and second misfiring detecting means 4 and 5, which operate on the mutually different detection principles as mentioned above, are connected to a first and a second input terminal, respectively, of an AND circuit 6 which serves as a misfiring decision means for outputting a misfiring detection signal only when the outputs of both first and second misfiring detecting means 4, 5 indicate substantially simultaneously the occurrence of misfiring.

The AND circuit 6 may be incorporated in a microcomputer 10, as shown in FIG. 2, which may include memory circuits such as RAM for storing data and ROM storing processing programs and a single-chip computer composed of a central processing unit or CPU, an input interface for conditioning input signals supplied from the crank angle sensor 2, the air/fuel ratio sensor 3 and others, and an analogue-to-digital (A/D) converter for converting the input analogue signals to digital signals, a timer counter (e.g., a free-running counter) for counting a basic clock pulse signal at every predetermined time interval.

The engine 1 is further provided with an air-flow meter 11, a throttle opening sensor 12 and an intake manifold pressure sensor 13, as shown in FIG. 2. The outputs of these sensors are utilized for controlling the engine operation as well.

Figure 3:
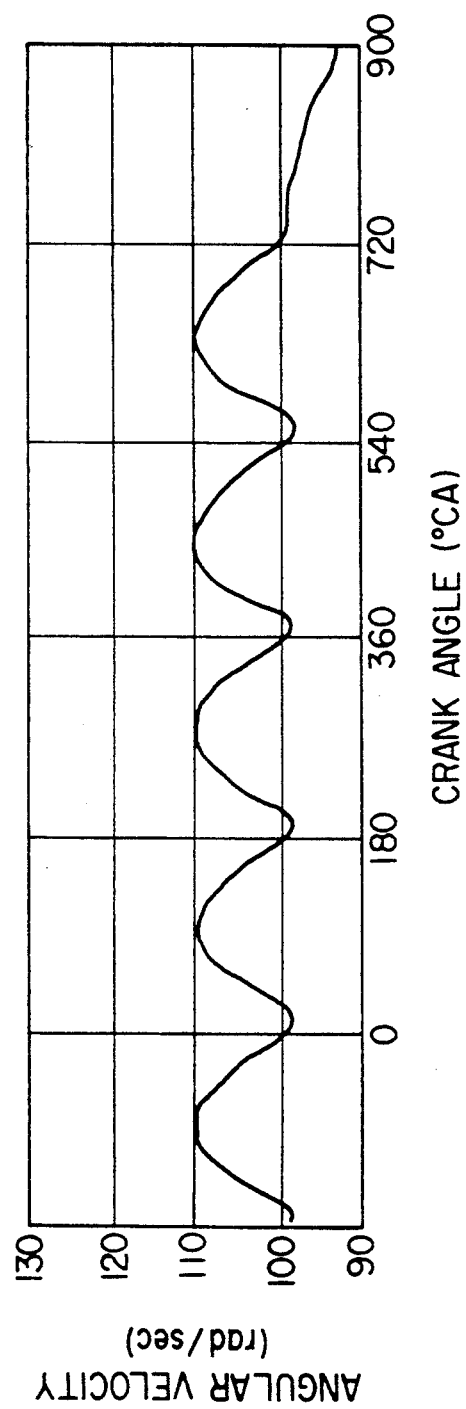
FIG. 3 is a waveform diagram showing a change in the angular velocity of a crankshaft as a function of the crank angle for illustrating the concept underlying a first misfiring detecting means according to the invention.
Figure 4:
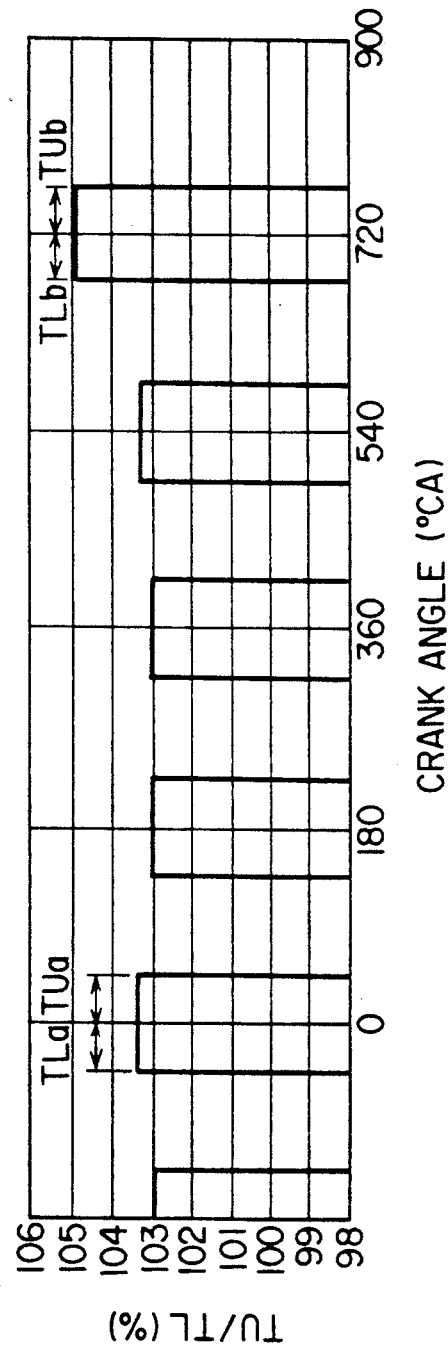
FIG. 4 is a diagram showing changes in a time ratio defined hereinafter as a function of the crank angle for illustrating the operation principle of the first misfiring detecting means.
Figure 5:
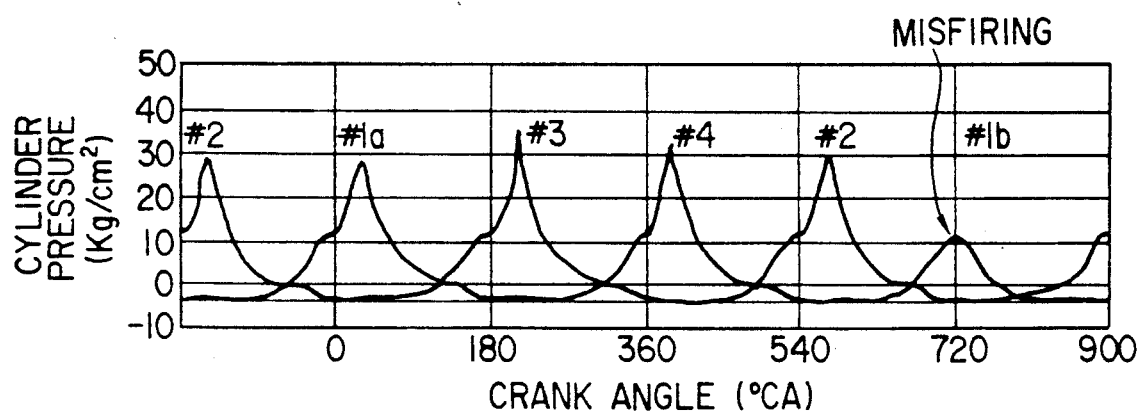
FIG. 5 is a waveform diagram showing a relation between the crank angle and the cylinder pressure for illustrating how the latter changes upon occurrence of misfiring.

Now, referring to FIGS. 3, 4 and 5, description will be turned to the concept underlying the present invention on the assumption that the engine of concern is a four-cycle, four-cylinder engine. FIG. 3 is a waveform diagram showing a change in the angular velocity (rad/sec) of the crankshaft as a function of the crank angle in the four-cycle, four-cylinder engine in the state in which the engine runs at a speed of 1000 rpm with the throttle valve being fully opened. FIG. 4 is a diagram for graphically illustrating a change in the time ratio (TU/TL) defined hereinafter upon occurrence of misfiring. FIG. 5 is a waveform diagram for graphically illustrating changes in pressures within engine cylinders.

Referring to FIG. 4, the ratio TU/TL taken along the ordinate represents the time ratio between the time TL taken for the crankshaft to rotate a predetermined angular distance (e.g., 45° CA) preceding to the reference position (e.g., top dead center or TDC in the compression stroke of a given engine cylinder) and the time TU taken for the crankshaft to rotate a predetermined angular distance (e.g., 45° CA) in succession to the TDC in the compression stroke. FIG. 4 shows, by way of example, that misfiring takes place in cylinder #1 for some cause such as abnormal operation of an ignition system after a series of normal combustion in cylinders #1, #3, #4 and #2 in this sequence.

Let's suppose that misfiring takes place in cylinder #1 and represent the above-mentioned time ratio by TUb/TLb in the case of misfiring in cylinder #1 as well as the time ratio by TUa/TLa in the case of normal combustion therein. As can be seen from FIG. 4, the time ratio TUb/TLb is distinctly greater than the ratio TUa/TLa. This can be explained by the fact that in the case of normal combustion, the crankshaft angular velocity decreases in a first interval TLa corresponding to the predetermined angular distance preceding TDC and increases in a second interval TUa corresponding to the predetermined angular distance succeeding TDC because of explosive combustion in succession to the compression stroke, whereas upon occurrence of misfiring, the angular velocity continues to further decrease even in the second interval TLb. In other words, the time TUb required for the crankshaft to rotate the predetermined distance succeeding the TDC becomes longer upon occurrence of misfiring when compared with the corresponding time TUa for normal combustion. Thus, it is possible to detect the occurrence of misfiring by making use of the fact that the time ratio TU/TL for a given cylinder becomes greater upon occurrence of misfiring in that given cylinder.

Figure 6:
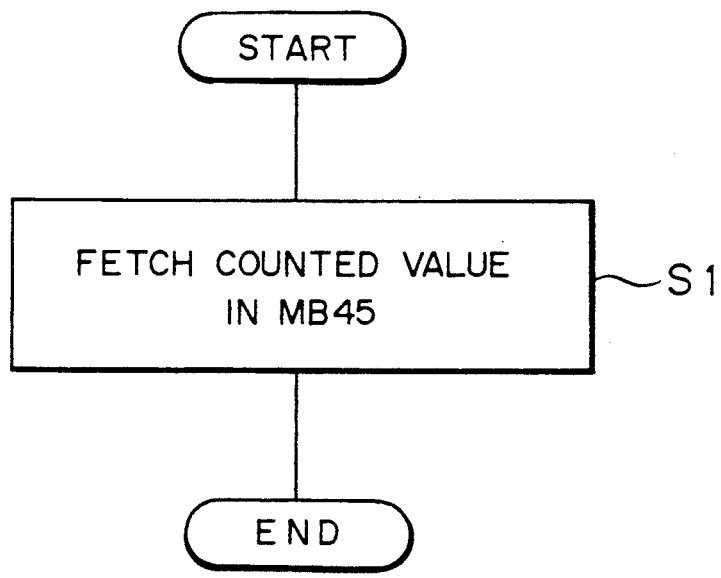
FIG. 6 is a flow chart for illustrating a count value fetching processing effected at every 45° CA (crankshaft angle) before top dead center (TDC) in the compression stroke for validating a misfiring detection processing in response to the output signal of a crank angle sensor.
Figure 7:
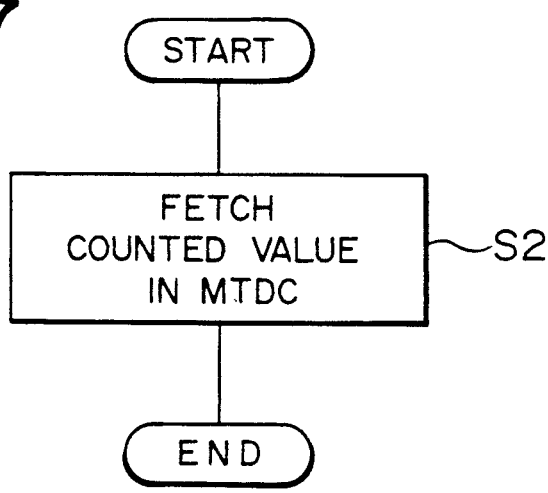
FIG. 7 is a flow chart for illustrating a count value fetching processing effected at every top dead center (TDC) in the compression stroke in a given engine cylinder.
Figure 8:
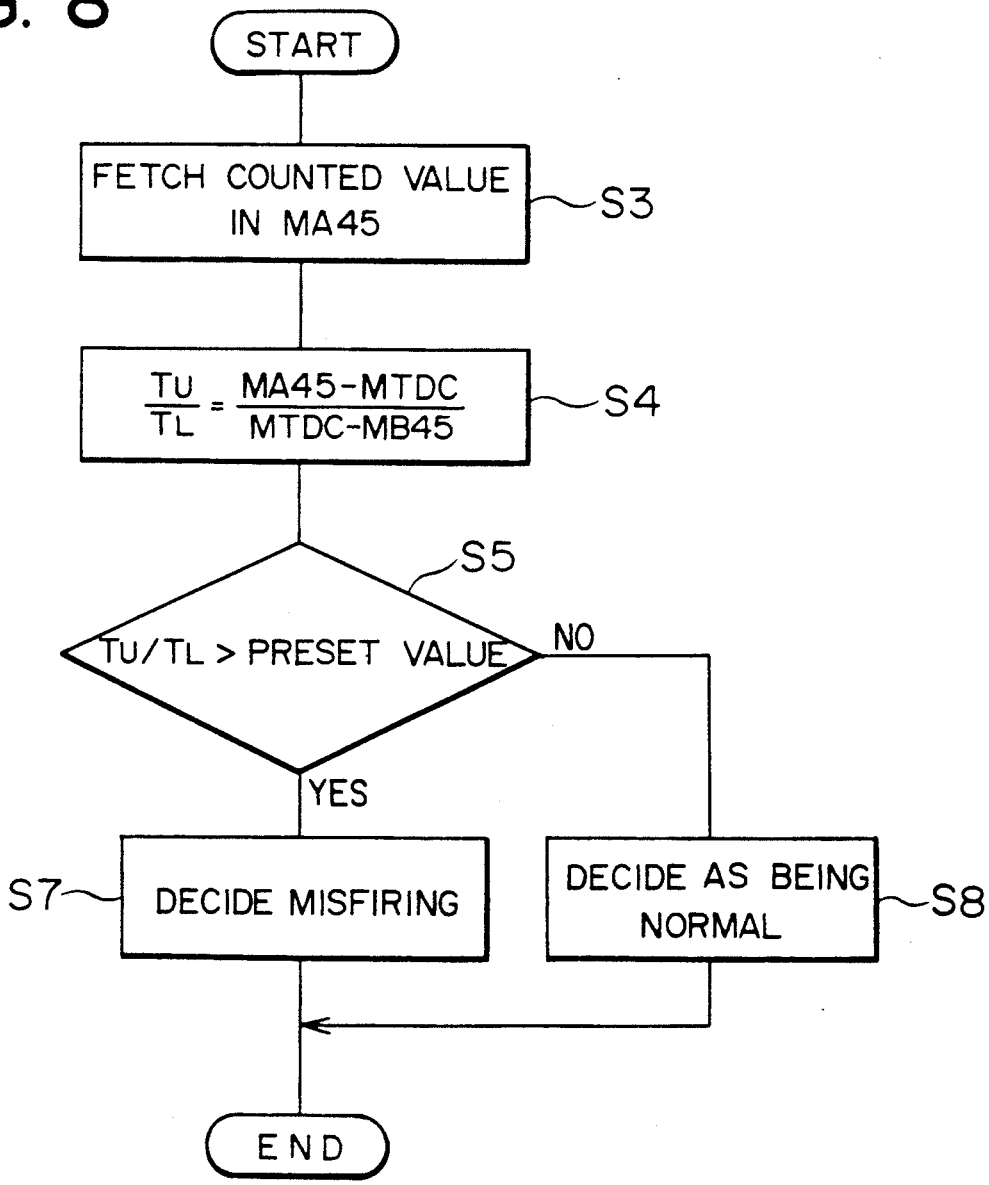
FIG. 8 is a flow chart for illustrating arithmetic processing involved in the misfiring detection which is performed at every 45° CA after top dead center in the compression stroke.

Now, the first misfiring detecting means based on the above-mentioned observation will be described. FIGS. 6 to 8 are flow charts for illustrating, by way of example, processing executed by the CPU of the microcomputer 10 for detecting the occurrence of misfiring by measuring the times taken for the crankshaft to rotate the predetermined angular distances before and after the predetermined reference angular position (e.g., TDC in the compression stroke) and making decision as to occurrence of misfiring on the basis of the ratio of the measured times.

Referring to FIG. 6, the processing shown therein is commenced in response to the signal outputted from the crank angle sensor 2. In step S1, a timer counted value, which is incremented by a basic clock pulse at every predetermined time interval, is read out at every time point when a predetermined marker point on the crankshaft passes by the angular position located at 45° CA before TDC in the compression stroke. The counted value read out is stored in a memory area or buffer MB45 of the RAM of the microcomputer 10. Thus, the value stored in the memory buffer MB45 represents the time point at which the marker point on the crankshaft has reached the position located 45° CA before TDC in the compression stroke.

The processing illustrated in FIG. 7 is activated by the signal outputted from the crank angle sensor 2 every time the marker point on the crankshaft passes by TDC. More specifically, in step S2, the timer counted value which is incremented in response to the basic clock pulse at every predetermined time interval is read out every time the marker point on the crankshaft passes by TDC in the compression stroke. The value read out from the timer is stored in a memory buffer MTDC incorporated in the microcomputer 10. Thus, the value stored in the memory buffer MTDC represents the time point at which the marker point on the crankshaft has passed by the TDC in the compression stroke in a given cylinder in the course of rotation thereof.

FIG. 8 is a flow chart for illustrating an arithmetic processing executed every time the marker point on the crankshaft has reached the position located 45° CA after TDC in the compression stroke. Referring to FIG. 8, in step S3, the timer counted value is fetched upon the start of execution of this processing and stored in a memory buffer MA45. In step S4, the time ratio TU/TL is determined in accordance with the following equation (1):

$$TU/TL = (MA45 - MTDC)/(MTDC - MB45) \quad (1)$$

In the above equation (1), the term (MA45−MTDC) represents the time taken for the crankshaft to rotate from TDC to the position located 45° CA after TDC and the term (MTDC−MB45) represents the time taken for the crankshaft to rotate from the position 45° CA before TDC to the TDC.

Subsequently, in step S5, decision is made as to whether or not the time ratio TU/TL determined in step S4 is greater than a preset value. If so (YES), it is then determined in step S7 that misfiring has occurred, whereupon the processing comes to an end. On the other hand, when decision is made in step S5 that the time ratio TU/TL is not greater than the preset value, it is then determined in step S8 that normal combustion has taken place in the cylinder of concern, whereupon the processing comes to an end.

The signal representing the results of the decision made as to the occurrence of misfiring is applied to one of the inputs of the AND 6.

Figure 9:
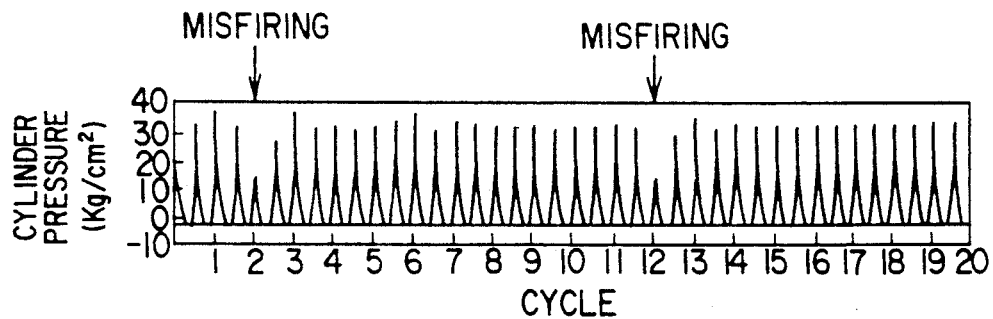
FIG. 9 is a waveform diagram showing changes in cylinder pressures in a four-cycle, four-cylinder engine for illustrating in what manner the cylinder pressure is affected by misfiring.
Figure 10:
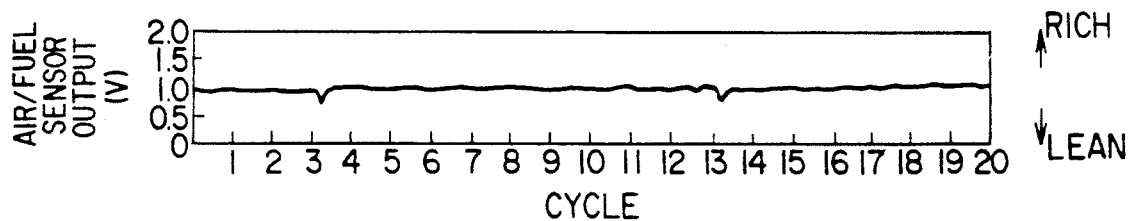
FIG. 10 is a waveform diagram showing the output signal of an air/fuel ratio sensor for illustrating how the sensor output signal changes upon occurrence of misfiring in the four-cycle, four-cylinder engine.
Figure 11:
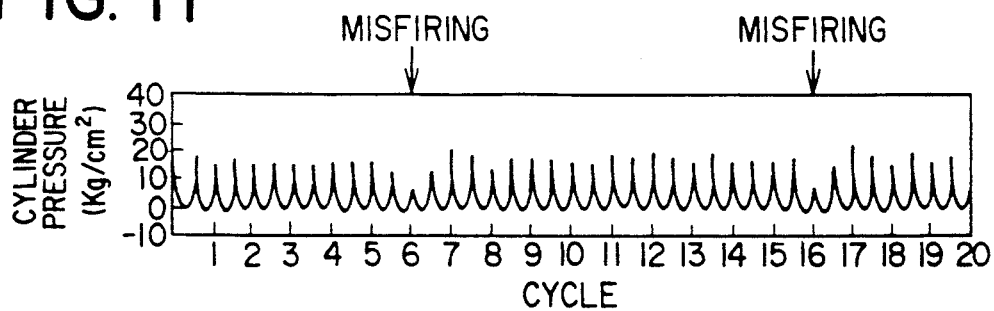
FIG. 11 is a diagram similar to FIG. 9 and shows changes in cylinder pressures of the four-cycle, four-cylinder engine in a high-speed and light-load operation state thereof.
Figure 12:
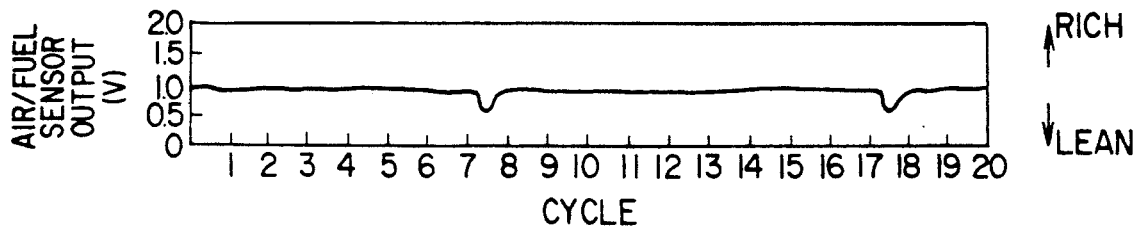
FIG. 12 is a diagram similar to FIG. 10 and shows changes in the output signal of the air/fuel ratio sensor upon occurrence of misfiring in a four-cycle, four-cylinder engine in the high-speed, light-load operation state thereof.

Next, let's consider misfiring detection realized by processing the output signal of the air/fuel ratio sensor 3. In this conjunction, FIG. 9 is a waveform diagram illustrating changes in cylinder pressures in a four-cycle, four-cylinder engine, and FIG. 10 is a waveform diagram showing the output signal of the air/fuel ratio sensor 3 on the assumption that the engine speed is 1000 rpm with the throttle valve in the fully opened state. Further, FIGS. 11 and 12 are views similar to FIGS. 9 and 10, respectively, but they are plotted on the assumption that the engine is running at a speed of 1000 rpm under a light load in which the throttle valve is moved to a half opened position with the intake manifold pressure being minus 400 mmHg. As will be understood from the waveform diagrams shown in FIGS. 9, 10, 11 and 12, the signal outputted from the air/fuel ratio sensor undergoes abnormal change upon occurrence of misfiring. The same holds true for the cylinder pressure. In the case of the illustrated embodiment, the output signal of the air/fuel ratio sensor 3 is processed by the second misfiring detecting means 5, the output of which is applied to the other input of the AND circuit 6. It should, however, be noted that a pressure sensor may be provided for each of the engine cylinders and the output signal of the pressure sensor may be similarly processed for detecting misfiring, wherein the output resulting from the processing of the pressure sensor signal may be applied to a further input of the AND circuit 6 instead of or in addition to the output signal of the second misfiring detection means 5. Parenthetically, the processing of the output signal of the air/fuel ratio sensor or that of the pressure sensor for deciding the occurrence of misfire may be realized by comparing the peak value of the output signal with a predetermined level, as will be readily understood from FIGS. 9 and 10.

As will be apparent from the foregoing description, the first misfiring detecting means 4 makes decision as to occurrence of misfiring on the basis of abnormal change in the angular velocity of the crankshaft by processing the signal outputted from the crank angle sensor 2, wherein the signal representing the result of the misfiring decision is applied to one input of the AND circuit 6. The second misfiring detecting means 5 processes the signal outputted from the air/fuel ratio sensor 3 to make decision as to occurrence of misfiring on the basis of abnormal change in the air/fuel ratio. The output signal representing the result of the decision made by the second misfiring detecting means is also applied to the other input of the AND circuit 6, which thus outputs a misfiring detection signal only when the outputs of the first and second misfiring detecting means 4 and 5 both indicate the occurrence of misfiring. The output signal of the AND circuit 6 may be utilized for lighting a misfiring alarm lamp.

By logical determination of the outputs of both misfiring detecting means, which may be realized by software running on the microcomputer as described previously, reliability in misfiring detection can significantly be improved. More specifically, with only the misfiring detection performed by the first detecting means based on the abnormal change in the angular velocity of the crankshaft, erroneous or false misfiring detection may possibly result particularly when the engine is running at a high speed in the light loaded or unload state because in this case the angular velocity of the crankshaft will undergo only an insignificant or limited change due to a low friction loss and high inertial energy of the engine. Besides, variations in the angular velocity of the crankshaft brought about by other events than misfiring such as shocks and vibrations to which the motor vehicle having the engine installed is subjected in the course of running on a rough or bad road, for example, may result in a false misfire detection. On the other hand, the second misfiring detecting means 5 can not positively avoid erroneous detection either, because the air/fuel ratio is susceptible to variations upon acceleration and deceleration. Additionally, a change in the air-fuel ratio due to misfiring may be so small as to make it difficult to detect the occurrence of misfiring although it depends on the operating state of the engine, as will be seen from FIG. 10.

The problems mentioned above can satisfactorily be solved according to the present invention including a plurality of misfiring detecting means, which operate on the basis of mutually different misfiring detection principles, respectively, since a misfiring detection signal is produced only when all the plural misfiring detection means decide the occurrence of misfiring substantially simultaneously. Thus, reliability in detecting the occurrence of misfiring can significantly be improved.

While the invention has been described in terms of its preferred embodiments, it should be understood that numerous modifications may be made thereto without departing from the spirit and scope of the invention as defined in the appended claims. By way of example, the invention can equally be applied to a one-cylinder engine as well as to a multi-cylinder engine in more general terms. It is therefore intended that all such modifications fall within the scope of the appended claims.

What is claimed is:

1. An apparatus for detecting occurrence of misfiring in an internal combustion engine, comprising:
   at least two misfiring detecting means for detecting misfiring independently of each other, said misfiring detecting means operating based on mutually different detection principles, respectively; and
   means operatively coupled to the outputs of said at least two misfiring detecting means for deciding occurrence of misfiring only when both outputs of said at least two misfiring detecting means indicate occurrence of misfiring.

2. An apparatus for detecting occurrence of misfiring in an internal combustion engine, comprising:
   a plurality of sensors for sensing engine operating parameters which differ from one another and which represent a combustion state of said engine;
   a plurality of misfiring detecting means provided in association with said sensors, respectively, for processing output signals of said sensors to thereby detect occurrence of misfiring in the engine independently of one another; and
   decision means connected to the outputs of said misfiring detecting means for deciding occurrence of misfiring when at least two of said misfiring detecting means detect occurrence of misfiring substantially simultaneously.

3. A misfiring detecting apparatus according to claim 2, wherein said misfiring detecting means comprise a first means for detecting occurrence of misfiring on the basis of a change in an angular velocity of a crankshaft of said engine.

4. A misfiring detecting apparatus according to claim 3, wherein said first means calculates a time ratio between a time taken for said crankshaft to rotate a first predetermined angular distance before a predetermined angular reference position and a time taken for said crankshaft to rotate a second predetermined angular distance after said predetermined angular reference position, and determines occurrence of misfiring when said time ratio exceeds a predetermined value.

5. A misfiring detecting apparatus according to claim 3, wherein said misfiring detecting means further comprise a second means which detects occurrence of misfiring on the basis of a change in an air/fuel ratio of an exhaust gas discharged from said engine.

6. A misfiring detecting apparatus according to claim 5, wherein said misfiring detecting means further comprise a third means for detecting occurrence of misfiring on the basis of a change in the pressure within an engine cylinder.

7. A misfiring detecting apparatus according to claim 2, wherein said decision means comprises an AND circuit for performing logical decision from the outputs of said plural misfiring detecting means.

* * * * *